US012802890B2

(12) United States Patent
Wada et al.

(10) Patent No.: US 12,802,890 B2
(45) Date of Patent: Nov. 17, 2026

(54) SOLID ELECTROLYTE CAPACITOR AND METHOD FOR MANUFACTURING SAME

(71) Applicant: CARLIT CO., LTD., Tokyo (JP)

(72) Inventors: Naoto Wada, Gunma (JP); Kazuyuki Kanemoto, Gunma (JP); Ryota Nagamatsu, Gunma (JP); Haruka Maeta, Gunma (JP); Maui Nakayama, Gunma (JP)

(73) Assignee: CARLIT CO., LTD., Tokyo (JP)

( * ) Notice: Subject to any disclaimer, the term of this patent is extended or adjusted under 35 U.S.C. 154(b) by 75 days.

(21) Appl. No.: 18/841,725

(22) PCT Filed: Feb. 20, 2023

(86) PCT No.: PCT/JP2023/006021

§ 371 (c)(1),
(2) Date: Aug. 27, 2024

(87) PCT Pub. No.: WO2023/171344

PCT Pub. Date: Sep. 14, 2023

(65) Prior Publication Data

US 2025/0174409 A1 May 29, 2025

(30) Foreign Application Priority Data

Mar. 10, 2022 (JP) ................................ 2022-037588

(51) Int. Cl.
*H01G 9/025* (2006.01)
*H01G 9/00* (2006.01)
*H01G 9/15* (2006.01)

(52) U.S. Cl.
CPC ........... *H01G 9/025* (2013.01); *H01G 9/0036* (2013.01); *H01G 9/15* (2013.01)

(58) Field of Classification Search
None
See application file for complete search history.

(56) References Cited

U.S. PATENT DOCUMENTS

| | | | | |
|---|---|---|---|---|
| 2021/0202184 | A1 | 7/2021 | Koseki et al. | |
| 2022/0181093 | A1* | 6/2022 | Liu | H01G 11/84 |
| 2025/0174409 | A1* | 5/2025 | Wada | H01G 9/00 |

FOREIGN PATENT DOCUMENTS

| | | | | | |
|---|---|---|---|---|---|
| CN | 104205624 | A | * 12/2014 | H01G 11/04 |
| CN | 112164587 | A | * 1/2021 | H01G 9/045 |
| CN | 114621396 | A | * 6/2022 | C08F 2/44 |
| CN | 115917821 | A | * 4/2023 | H01B 1/06 |
| JP | 2014-45115 | A | 3/2014 | |
| JP | 2014045115 | A | * 3/2014 | |
| JP | 2017-4986 | A | 1/2017 | |
| JP | 2017-17188 | A | 1/2017 | |
| JP | 6487285 | B2 | * 3/2019 | |
| JP | 2019-68004 | A | 4/2019 | |
| WO | WO-2019069917 | A1 | * 4/2019 | H01G 9/022 |
| WO | WO-2023021885 | A1 | * 2/2023 | H01G 11/62 |

OTHER PUBLICATIONS

Translation CN '624 (Year: 2014).*
Translation JP '115 (Year: 2014).*
Translation JP '285 (Year: 2019).*
International Search Report & Written Opinion issued May 16, 2023 in PCT/JP2023/006021, filed on Feb. 20, 2023, 11 pages (with English Translation of Search Report).

* cited by examiner

*Primary Examiner* — Dion R. Ferguson
(74) *Attorney, Agent, or Firm* — Oblon, McClelland, Maier & Neustadt, L.L.P.

(57) ABSTRACT

A solid electrolyte capacitor, including: a positive electrode metal having a dielectric oxide film formed thereon; a gel layer on the positive electrode metal; and a solid electrolyte layer on the gel layer. A method for producing a solid electrolyte capacitor, including: forming a gel layer on a positive electrode metal having a dielectric oxide film formed thereon; and subsequently forming a solid electrolyte layer. A pretreatment agent for producing a solid electrolyte capacitor, including: one or more compounds selected from zwitterionic compounds represented by general formulas (2) to (6), water, and a gelling agent.

20 Claims, No Drawings

SOLID ELECTROLYTE CAPACITOR AND METHOD FOR MANUFACTURING SAME

CROSS-REFERENCE TO RELATED APPLICATIONS

The present application is a 35 U.S.C. § 371 national stage application of International patent application PCT/JP2023/006021, filed Feb. 20, 2023, which is based on and claims the priority to Japanese Application No. 2022-037588, filed Mar. 10, 2022. The entire contents of these applications are incorporated herein by reference.

TECHNICAL FIELD

The present invention relates to a solid electrolyte capacitor and a production method thereof.

BACKGROUND ART

Electrically conductive polymers such as polyaniline, polypyrrole and polythiophene have excellent stability and conductivity and thus are applied to an electrolyte for a solid electrolyte capacitor.

These electrically conductive polymers are generally insoluble or not easily soluble in a solvent and are unmeltable, and thus molding and processing thereof are difficult.

In a general solid electrolyte capacitor, a solid electrolyte layer containing an electrically conductive polymer that functions as a negative electrode is formed on a positive electrode metal having a dielectric oxide film.

As a method for forming a solid electrolyte layer, a chemical oxidative polymerization method is known, and for example, a solid electrolyte layer containing an electrically conductive polymer can be formed on a positive electrode metal through polymerization by adhering or contacting a solution containing a monomer compound and an oxidizer onto a positive electrode metal having a dielectric oxide film formed thereon.

In the chemical oxidative polymerization method, however, the dielectric oxide film is damaged by the oxidizer used during the chemical oxidative polymerization, and thus there is a problem of a decrease in the withstand voltage of the solid electrolyte capacitor.

PTL 1 discloses a method for obtaining a capacitor having high withstand voltage by adding boric acid and a dihydric glycol that does not contain any tri- or higher-hydric glycol in advance to a composition for forming a solid electrolyte and thus generating a borate ester having capability of repairing a dielectric oxide film in the solid electrolyte during the formation of the solid electrolyte through drying and solidification.

CITATION LIST

Patent Literature

PTL 1: JP2017-004986A

SUMMARY OF INVENTION

Technical Problem

It was found by the examination by the present inventors that, with the solid electrolyte capacitor of PTL 1, in which a borate ester is generated in the solid electrolyte, the withstand voltage characteristic, the leakage current characteristic, the static capacitance and the equivalent series resistance characteristic are insufficient.

Accordingly, the invention provides a solid electrolyte capacitor having excellent characteristics with regards to withstand voltage, leakage current, static capacitance and equivalent series resistance and a production method thereof.

Solution to Problem

The present inventors have found that a solid electrolyte capacitor having excellent characteristics with regards to withstand voltage, leakage current, static capacitance and equivalent series resistance and a production method thereof can be provided by treating a positive electrode metal having a dielectric oxide film formed thereon so as to retain a gel layer and then forming a solid electrolyte containing an electrically conductive polymer on the positive electrode metal.

That is, the invention is as shown below.

[1]A solid electrolyte capacitor having a gel layer on a positive electrode metal having a dielectric oxide film formed thereon and a solid electrolyte layer on the gel layer.

[2] The solid electrolyte capacitor according to [1] characterized in that the gel layer contains a hydrogel.

[3] The solid electrolyte capacitor according to [1] or [2] characterized in that the gel layer contains a physical gel.

[4] The solid electrolyte capacitor according to any of [1] to [3] characterized in that the gel layer contains one or more gelling agents selected from the group consisting of agar, gelatin, carrageenan, alginic acid, cellulose, polyvinyl alcohol, fine silica particles, fine alumina particles, fine titanium particles and polystyrene sulfonic acid.

[5] The solid electrolyte capacitor according to any of [1] to (4) characterized in that the gel layer contains an electrolyte.

[6] The solid electrolyte capacitor according to any of [1] to [5] characterized in that the gel layer contains one or more compounds selected from the group consisting of zwitterionic compounds represented by the following general formulae (2) to (6):

[Chem. 2-6]

(2)

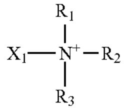

(3)

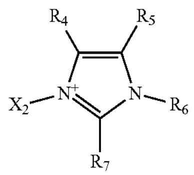

(4)

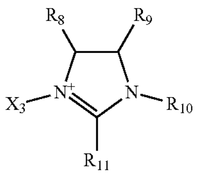

-continued (5)

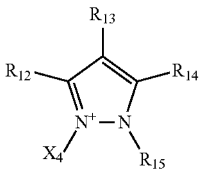

(6)

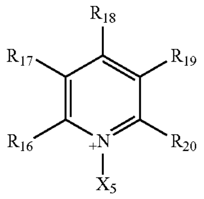

(wherein in the formulae (2) to (6), $R_1$ to $R_{20}$ each independently are an organic group which may have either or both of a primary amino group and a secondary amino group or a hydrogen atom, wherein neighboring R's may be linked to form an alkylene group having 2 to 6 carbon atoms, and $X_1$ to $X_5$ represent a group having 0 to 15 carbon atoms containing any of a sulfonate anion, a carboxylate anion, a phosphate anion, a borate anion and an anion represented by the formula (1))

[Chem. 1]

(1)

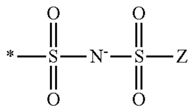

(wherein in the formula (1), Z represents an alkyl group having 1 to 15 carbon atoms, an alkyl halide group having 1 to 15 carbon atoms, an aryl group having 6 to 15 carbon atoms, an aryl halide group having 6 to 15 carbon atoms or a halogen, and * represents a bond.)

[7] The solid electrolyte capacitor according to any of [1] to [6] characterized in that the gel layer contains one or more compounds selected from the group consisting of electrolytes represented b the following general formulae (11) to (15):

[Chem. 11-15]

(11)

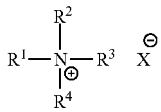

(12)

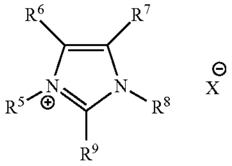

-continued (13)

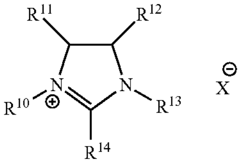

(14)

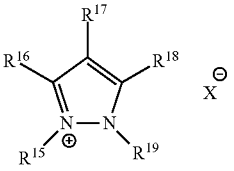

(15)

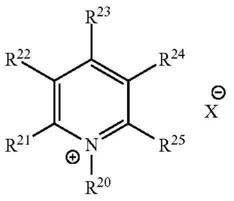

(wherein in the formulae (11) to (15), the groups $R^1$ to $R^{23}$ are hydrogen, an alkyl group having 1 to 18 carbon atoms, an alkoxy group having 1 to 18 carbon atoms or a hydroxy group which may be the same or different, wherein neighboring groups of $R^1$ to $R^{25}$ may be linked to form an alkylene group having 2 to 6 carbon atoms, and $X^-$ is a carboxylate anion, a boron compound anion or a phosphoric acid compound anion.)

[8] The solid electrolyte capacitor according to [1] to [7] characterized in that the gel layer contains a phosphate ester compound represented by the following general formula (7) or (8):

[Chem. 7]

(7)

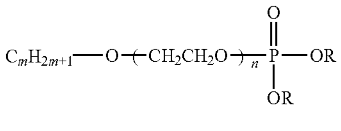

[Chem. 8]

(8)

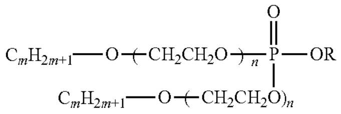

(wherein in the general formulae, m is an integer of 6 to 25, n is an integer of 1 to 25, R is at least one kind selected from hydrogen, sodium, potassium and monoethanolamine, and the two R's in the formula (2) may be the same or different.)

[9] The solid electrolyte capacitor according to [1] to [8] characterized in that the gel layer contains a borate ester compound represented by the following general formula (9):

[Chem. 9]

(9)

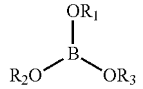

(wherein in the general formula (9), $R_1$ to $R_5$ may be the same or different and are a hydrogen atom or an alkyl group having 1 to 12 carbon atoms.)

[10] The solid electrolyte capacitor according to any of [1] to [9] characterized in that the water content of the gel layer is 0.01% to 20.

[11]A method for producing a solid electrolyte capacitor, including at least a step (a) of forming a gel layer on a positive electrode metal having a dielectric oxide film formed thereon and a step (b) of subsequently forming a solid electrolyte layer.

[12] The method for producing a solid electrolyte capacitor according to [11] characterized in that the step (a) of forming the gel layer is a step of forming the gel layer on the positive electrode metal having the dielectric oxide film formed thereon with a pretreatment agent.

[13] A pretreatment agent for a solid electrolyte capacitor containing one or more compounds selected from the group consisting of zwitterionic compounds represented by the following general formulae (2) to (6), water and a gelling agent:

[Chem. 2-6]

(2)

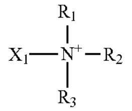

(3)

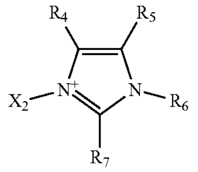

(4)

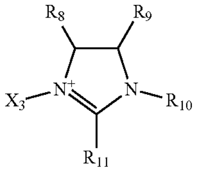

(5)

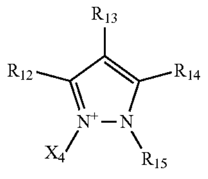

-continued (6)

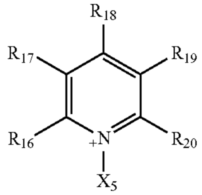

(wherein in the formulae (2) to (6), $R_1$ to $R_{20}$ each independently are an organic group which may have either or both of a primary amino group and a secondary amino group or a hydrogen atom, wherein neighboring R's may be linked to form an alkylene group having 2 to 6 carbon atoms, and $X_1$ to $X_5$ represent a group having 0 to 15 carbon atoms containing any of a sulfonate anion, a carboxylate anion, a phosphate anion, a borate anion and an anion represented by the formula (1))

[Chem. 1]

(1)

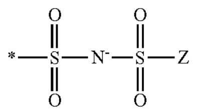

(wherein in the formula (1), Z represents an alkyl group having 1 to 15 carbon atoms, an alkyl halide group having 1 to 15 carbon atoms, an aryl group having 6 to 15 carbon atoms, an aryl halide group having 6 to 15 carbon atoms or a halogen, and * represents a bond.)

Advantageous Effects of Invention

According to the invention, a solid electrolyte capacitor having excellent characteristics with regards to withstand voltage, leakage current, static capacitance and equivalent series resistance and a production method thereof can be provided.

DESCRIPTION OF EMBODIMENTS

The invention is explained below.

The solid electrolyte capacitor produced by the invention is a solid electrolyte capacitor obtained by treating a positive electrode metal having a dielectric oxide film formed thereon so as to retain a gel layer and then forming a solid electrolyte layer containing an electrically conductive polymer on the gel layer.

[Positive Electrode Metal Having Dielectric Oxide Film Formed Thereon]

Examples of the positive electrode metal include positive electrode metals such as aluminum, tantalum, niobium and titanium. Regarding the form of the positive electrode metal, the positive electrode metal is used in the form of a sintered material obtained by sintering fine particles or a foil or a plate which has been subjected to roughening treatment by etching or the like.

Of these positive electrode metals, an aluminum foil which has been subjected to roughening treatment by etching or the like is extremely preferable because the effects of action of the invention are easily exhibited.

By subjecting the positive electrode metal to known chemical conversion treatment, a dielectric oxide film can be formed on the surface of the positive electrode metal. For example, through anodic oxidation treatment in an aqueous solution such as diammonium adipate, a dielectric oxide film can be formed on the positive electrode metal.

[Electrolyte]

For improving the leakage current characteristic, the withstand voltage characteristic, the tan δ, the static capacitance and the equivalent series resistance characteristic of the solid electrolyte capacitor, an electrolyte is preferably contained in the pretreatment agent and the gel layer of the invention.

As the electrolyte used in the invention, any electrolyte which is generally used for an electrolyte capacitor can be used. Of electrolytes, in particular, any of the compounds represented by the following general formulae (11) to (15) is preferably used as the electrolyte.

[Chem. 3]

(11)

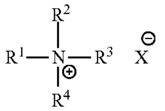

(12)

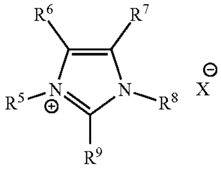

(13)

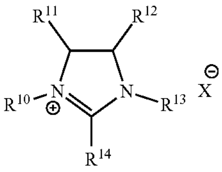

(14)

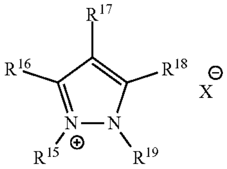

(15)

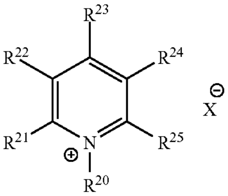

In the general formulae (11) to (15), the groups $R^1$ to $R^{25}$ are hydrogen, an alkyl group having 1 to 18 carbon atoms, an alkoxy group having 1 to 18 carbon atoms or a hydroxy group which may be the same or different, and neighboring groups of $R^1$ to $R^{25}$ may be linked to form an alkylene group having 2 to 6 carbon atoms. $X^-$ is a carboxylate anion, a boron compound anion or a phosphoric acid compound anion.

Specific examples of the cationic moiety of the compound represented by the general formula (11) include: ammonium cation; quaternary ammonium cations such as tetramethyl ammonium cation, tetraethyl ammonium cation, tetrapropyl ammonium cation, tetraisopropyl ammonium cation, tetrabutyl ammonium cation, trimethylethyl ammonium cation, triethylmethyl ammonium cation, dimethyldiethyl ammonium cation, dimethylethyl methoxyethyl ammonium cation, dimethylethyl methoxymethyl ammonium cation, dimethylethyl ethoxyethyl ammonium cation, trimethylpropyl ammonium cation, dimethylethylpropyl ammonium cation, triethylpropyl ammonium cation, spiro-(1,1')-bipyrrolidinium cation, piperidine-1-spiro-1'-pyrrolidinium cation and spiro-(1,1')-bipiperidinium cation; tertiary ammonium cations such as trimethylamine cation, triethylamine cation, tripropylamine cation, triisopropylamine cation, tributylamine cation, diethylmethylamine cation, dimethylethylamine cation, diethylmethoxyamine cation, dimethylmethoxyamine cation, dimethylethoxyamine cation, diethylethoxyamine cation, methylethylmethoxyamine cation, N-methylpyrrolidine cation, N-ethylpyrrolidine cation, N-propylpyrrolidine cation, N-isopropylpyrrolidine cation, N-butylpyrrolidine cation, N-methylpiperidine cation, N-ethylpiperidine cation, N-propylpiperidine cation, N-isopropylpiperidine cation and N-butylpiperidine cation; and secondary ammonium cations such as dimethylamine cation, diethylamine cation, diisopropylamine cation, dipropylamine cation, dibutylamine cation, methylethylamine cation, methylpropylamine cation, methylisopropylamine cation, methylbutylamine cation, ethylisopropylamine cation, ethylpropylamine cation, ethylbutylamine cation, isopropylbutylamine cation and pyrrolidine cation.

Of these, ammonium cation, tetraethyl ammonium cation, triethylmethyl ammonium cation, spiro-(1,1')-bipyrrolidinium cation, N-methylpyrrolidine cation, dimethylethylamine cation, diethylmethylamine cation, trimethylamine cation, triethylamine cation, diethylamine cation and the like have an excellent effect of improving the withstand voltage and/or the conductivity or an excellent effect of improving the heat resistance and thus are preferably used.

Specific examples of the cationic moiety of the compound represented by the general formula (12) include tetramethylimidazolium cation, tetraethylimidazolium cation, tetrapropylimidazolium cation, tetraisopropylimidazolium cation, tetrabutylimidazolium cation, 1,3-dimethylimidazolium cation, 1,3-diethylimidazolium cation, 1,3-dipropylimidazolium cation, 1,3-diisopropylimidazolium cation, 1,3-dibutylimidazolium cation, 1-methyl-3-ethylimidazolium cation, 1-ethyl-3-methylimidazolium cation, 1-butyl-3-methylimidazolium cation, 1-butyl-3-ethylimidazolium cation, 1,2,3-trimethylimidazolium cation, 1,2,3-triethylimidazolium cation, 1,2,3-tripropylimidazolium cation, 1,2,3-triisopropylimidazolium cation, 1,2,3-tributylimidazolium cation, 1,3-dimethyl-2-ethylimidazolium cation, and 1,2-dimethyl-3-ethyl-imidazolium cation. Of these, tetramethylimidazolium cation, tetraethylimidazolium cation, 1,3-dimethylimidazolium cation, 1,3-diethylimidazolium cation, 1-ethyl-3-methylimidazolium cation and the like exhibit high conductivity and have an excellent effect of improving the heat resistance and thus are preferably used.

Specific examples of the cationic moiety of the compound represented by the general formula (13) include tetramethylimidazolinium cation, tetraethylimidazolinium cation, tetrapropylimidazolinium cation, tetraisopropylimidazolinium cation, tetrabutylimidazolinium cation, 1,3,4-trimethyl-2-ethylimidazolinium cation, 1,3-dimethyl-2,4-diethylimidazolinium cation, 1,2-dimethyl-3,4-diethylimidazolinium cation, 1-methyl-2,3,4-triethylimidazolinium cation, 1,2,3-trimethylimidazolinium cation, 1,2,3-triethylimidazolinium cation, 1,2,3-tripropylimidazolinium cation, 1,2,3-triisopropylimidazolinium cation, 1,2,3-tributylimidazolinium cation, 1,3-dimethyl-2-ethylimidazolinium cation, 1-ethyl-2,3-dimethylimidazolinium cation, 4-cyano-1,2,3-trimethylimidazolinium cation, 3-cyanomethyl-1,2-dimethylimidazolinium cation, 2-cyanomethyl-1,3-dimethylimidazolinium cation, 4-acetyl-1,2,3-trimethylimidazolinium cation, 3-acetylmethyl-1,2-dimethylimidazolinium cation, 4-methylcarbooxymethyl-1,2,3-trimethylimidazolinium cation, 3-methylcarbooxymethyl-1,2-dimethylimidazolinium cation, 4-methoxy-1,2,3-trimethylimidazolinium cation, 3-methoxymethyl-1,2-dimethylimidazolinium cation, 4-formyl-1,2,3-trimethylimidazolinium cation, 3-formylmethyl-1,2-dimethylimidazolinium cation, 3-hydroxyethyl-1,2-dimethylimidazolinium cation, 4-hydroxymethyl-1,2,3-trimethylimidazolinium cation, and 2-hydroxyethyl-1,3-dimethylimidazolinium cation. Of these, tetramethylimidazolinium cation, tetraethylimidazolinium cation, 1,2,3-trimethylimidazolinium cation, 1,2,3-triethylimidazolinium cation and 1-ethyl-3-methylimidazolinium cation exhibit high conductivity and have an excellent effect of improving the heat resistance and thus are preferably used.

Specific examples of the cationic moiety of the compound represented by the general formula (14) include tetramethylpyrazolium cation, tetraethylpyrazolium cation, tetrapropylpyrazolium cation, tetraisopropylpyrazolium cation, tetrabutylpyrazolium cation, 1,2-dimethylpyrazolium cation, 1-methyl-2-ethylpyrazolium cation, 1,2-diethylpyrazolium cation, 1,2-dipropylpyrazolium cation, 1,2-dibutylpyrazolium cation, 1-methyl-2-propylpyrazolium cation, 1-methyl-2-butylpyrazolium cation, 1-methyl-2-hexylpyrazolium cation, 1-methyl-2-octylpyrazolium cation, 1-methyl-2-dodecylpyrazolium cation, 1,2,3-trimethylpyrazolium cation, 1,2,3-triethylpyrazolium cation, 1,2,3-tripropylpyrazolium cation, 1,2,3-triisopropylpyrazolium cation, 1,2,3-tributylpyrazolium cation, 1-ethyl-2,3,5-trimethylpyrazolium cation, 1-ethyl-3-methoxy-2,5-dimethylpyrazolium cation, 3-phenyl-1,2,5-trimethylpyrazolium cation, 3-methoxy-5-phenyl-1-ethyl-2-ethylpyrazolium cation, 1,2-tetramethylene-3,5-dimethylpyrazolium cation, 1,2-tetramethylene-3-phenyl-5-methylpyrazolium cation, and 1,2-tetramethylene-3-methoxy-5-methylpyrazolium cation. Of these, tetramethylpyrazolium cation, tetraethylpyrazolium cation, 1,2-dimethylpyrazolium cation, 1,2-diethylpyrazolium cation, 1-methyl-2-ethylpyrazolium cation and the like exhibit high conductivity and have an excellent effect of improving the heat resistance and thus are preferably used.

Specific examples of the cationic moiety of the compound represented by the general formula (15) include N-methylpyridinium cation, N-ethylpyridinium cation, N-propylpyridinium cation, N-isopropylpyridinium cation, N-butylpyridinium cation, N-hexylpyridinium cation, N-octylpyridinium cation, N-dodecylpyridinium cation, N-methyl-3-methylpyridinium cation, N-ethyl-3-methylpyridinium cation, N-propyl-3-methylpyridinium cation, N-butyl-3-methylpyridinium cation, N-butyl-4-methylpyridinium cation, and N-butyl-4-ethylpyridinium cation. Of these, N-methylpyridinium cation, N-ethylpyridinium cation, N-butylpyridinium cation, N-butyl-3-methylpyridinium cation and the like exhibit high conductivity and have an excellent effect of improving the heat resistance and thus are preferably used.

The anion X—, which is combined with the cation above, is a carboxylate anion, a boron compound anion or a phosphoric acid compound anion. The carboxylate anion is an anion of an organic carboxylic acid, such as an aromatic carboxylic acid and an aliphatic carboxylic acid, and the organic carboxylic acid may have a substituent. Specific examples thereof include: aromatic carboxylate anions such as phthalate anion, salicylate anion, isophthalate anion, terephthalate anion, trimellitate anion, pyromellitate anion, benzoate anion, resorcinate anion, cinnamate anion, naphthoate anion and mandelate anion; saturated carboxylate anions such as oxalate anion, malonate anion, succinate anion, glutarate anion, adipate anion, pimelate anion, suberate anion, azelate anion, sebacate anion, undecanedioate anion, dodecanedioate anion, tridecanedioate anion, tetradecanedioate anion, pentadecanedioate anion, hexadecanedioate anion, 3-tert-butyladipate anion, methylmalonate anion, ethylmalonate anion, propylmalonate anion, butylmalonate anion, pentylmalonate anion, hexylmalonate anion, dimethylmalonate anion, diethylmalonate anion, methylpropylmalonate anion, methylbutylmalonate anion, ethylpropylmalonate anion, dipropylmalonate anion, methylsuccinate anion, ethylsuccinate anion, 2,2-dimethylsuccinate anion, 2,3-dimethylsuccinate anion, 2-methylglutarate anion, 3-methylglutarate anion, 3-methyl-3-ethylglutarate anion, 3,3-diethylglutarate anion, methylsuccinate anion, 2-methylglutarate anion, 3-methylglutarate anion, 3,3-dimethylglutarate anion, 3-methyladipate anion, 1,6-decanedicarboxylate anion, 5,6-decanedicarboxylate anion, formate anion, acetate anion, propionate anion, butyrate anion, isobutyrate anion, valerate anion, caproate anion, enanthate anion, caprylate anion, pelargonate anion, laurate anion, myristate anion, stearate anion, behenate anion, undecanoate anion, borate anion, borodiglycolate anion, borodioxalate anion, borodisalicylate anion, borodiazelate anion, borodilactate anion, itaconate anion, tartrate anion, glycolate anion, lactate anion and pyruvate anion; and aliphatic carboxylate anions containing an unsaturated carboxylic acid such as maleate anion, fumarate anion, acrylate anion, methacrylate anion and oleate anion. A kind thereof may be used, or a combination of two or more kinds thereof may be used. Of these, phthalate anion, maleate anion, salicylate anion, benzoate anion, adipate anion, sebacate anion, azelate anion, 1,6-decanedicarboxylate anion, 3-tert-butyladipate anion, oxalate anion, formate anion, succinate anion, dodecanate anion and the like are preferable in view of the improvement of the withstand voltage and the thermal stability.

Examples of the boron compound anion include borate anion, borodiazelate anion, borodisalicylate anion, borodiglycolate anion, borodilactate anion, and borodioxalate anion. Of these, borate anion, borodisalicylate anion, borodiglycolate anion and the like are preferably used in view of the excellent withstand voltage.

As the phosphoric acid compound anion, phosphate anion, dimethylphosphate anion, diethylphosphate anion, dipropylphosphate anion, diisopropylphosphate anion, dibutylphosphate anion, dihexylphosphate anion, methylphosphate anion, ethylphosphate anion, propylphosphate anion, isopropylphosphate anion, butylphosphate anion, hexylphosphate anion, 2-ethylhexylphosphate anion, dioctylphosphate anion, octylphosphate anion, laurylphosphate anion, butoxyethylphosphate anion, isotridecylphosphate anion, oleylphosphate anion, tetracosylphosphate anion, ethylene glycol phosphate anion, 2-hydroxyethyl methacrylate phosphate anion and the like are preferably used.

Of the anions, for use in a low- to middle-voltage electrolyte capacitor, phthalate anion, maleate anion, oxalate anion, formate anion, succinate anion, sebacate anion, dodecanate anion, salicylate anion, benzoate anion, adipate anion, borodisalicylate anion, borodiglycolate anion and the like are preferably used, and high conductivity and excellent heat resistance are obtained. On the other hand, for use in a high-voltage electrolyte capacitor, sebacate anion, azelate anion, 1,6-decanedicarboxylate anion, 3-tert-butyladipate anion, borate anion, borodisalicylate anion, borodiglycolate anion and the like are preferably used, and an excellent effect with regards to the withstand voltage and the heat resistant is obtained.

Of the compounds represented by the general formulae (11) to (15), any of the compounds represented by the general formulae (11) to (13) is preferably used because the compounds are stable over a long period, have excellent heat resistance, repair the dielectric oxide film and improve the leakage current characteristic, the withstand voltage characteristic, the tan δ, the static capacitance and the equivalent series resistance characteristic of the solid electrolyte capacitor. Specific examples of the electrolyte used for a low- to middle-voltage electrolyte capacitor include dimethylethylamine maleate, dimethylethylamine phthalate, tetraethylammonium maleate, tetraethylammonium phthalate, trimethylamine maleate, trimethylamine phthalate, triethylamine maleate, triethylamine phthalate, diethylamine maleate, diethylamine phthalate, spiro-(1,1')-bipyrrolidinium maleate, spiro-(1,1')-bipyrrolidinium phthalate, 1-ethyl-3-methylimidazolium maleate, 1-ethyl-3-methylimidazolium phthalate, 1-ethyl-3-methylimidazolinium maleate, 1-ethyl-3-methylimidazolinium phthalate, tetramethylimidazolium phthalate, tetramethylimidazolinium phthalate, tetraethylimidazolium phthalate, tetraethylimidazolinium phthalate, ammonium phosphate, ammonium adipate, ammonium formate, ammonium succinate, ammonium oxalate, ammonium sebacate, ammonium dodecanoate, ammonium benzoate, and ammonium p-nitrobenzoate. On the other hand, as the electrolyte used for a high-voltage electrolyte capacitor, dimethylamine sebacate, diethylamine sebacate, trimethylamine sebacate, triethylamine sebacate, ammonium sebacate, dimethylamine azelate, diethylamine azelate, trimethylamine azelate, triethylamine azelate, ammonium azelate, ammonium 1,6-decanedicarboxylate, dimethylamine 1,6-decanedicarboxylate, diethylamine 1,6-decanedicarboxylate, trimethylamine 1,6-decanedicarboxylate, triethylamine 1,6-decanedicarboxylate, N-methylpyrrolidine borodisalicylate, ammonium borate and the like are preferably used.

[Zwitterionic Compound]

Because the withstand voltage characteristic, the tan δ, the static capacitance and the equivalent series resistance of the solid electrolyte capacitor become excellent, a zwitterionic compound is preferably contained in the electrolyte contained in the pretreatment agent and the gel layer of the invention. The zwitterionic compound is a compound which has a cationic moiety and an anionic moiety in the same molecule and in which the cationic moiety and the anionic moiety are each bonded to an atom in the molecule with a covalent bond. The zwitterionic compound is represented by $X^1$-A-$Y^-$ or the like, for example, and has a cationic moiety ($X^+$) and an anionic moiety ($Y^-$) in the same molecule. A is a linking group which links the cationic moiety ($X^+$) and the anionic moiety ($Y^-$) with a covalent bond. Here, the linking group A is generally a single bond or an organic group having 1 to 20 carbon atoms.

It is speculated that, because the zwitterionic compound contains a cationic moiety and an anionic moiety in the same molecule with a covalent bond, ionic diffusion due to the electric field around the electrodes does not occur easily, and as a result, the withstand voltage characteristic, the tan δ, the static capacitance and the equivalent series resistance of the solid electrolyte capacitor become excellent.

The zwitterionic compound which can be used in the invention is not particularly limited, and a known zwitterionic compound can be used. The anionic moiety in the zwitterionic compound may be, for example, a halogen ion, a sulfonate anion, a carboxylate anion, a phosphate anion, a phosphate ester anion, a phosphonate anion, a carbonate ester anion, a sulfate ester anion, a hydroxy anion, an anion represented by the following formula or the like. Of these, in order that the solid electrolyte capacitor exhibits excellent withstand voltage characteristic, high static capacitance, tan δ and low leakage current characteristic and has excellent moisture and heat resistance, the zwitterionic compound preferably has one or more anionic moieties selected from the group consisting of a sulfonate anion ($SO_3$—), a carboxylate anion ($COO^-$), a phosphate anion ($PO_3^-$) and an anion represented by the following formula (1).

[Chem. 4]

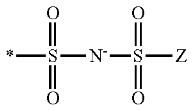

(1)

In the formula (1), Z represents an alkyl group having 1 to 15 carbon atoms, an alkyl halide group having 1 to 15 carbon atoms, an aryl group having 6 to 15 carbon atoms, an aryl halide group having 6 to 15 carbon atoms or a halogen, and * represents a bond. Of these, Z is preferably an alkyl group having 1 to 10 carbon atoms, an alkyl halide group having 1 to 10 carbon atoms or a halogen. Here, the first sulfur atom from the left on the sheet in the formula (1) forms a covalent bond with any atom in the zwitterionic compound.

The anionic moiety of the zwitterionic compound is preferably a sulfonate anion of the anionic moieties exemplified above. When the zwitterionic compound contains a sulfonate anion, the withstand voltage characteristic, the static capacitance, the leakage current characteristic, the tan δ, the equivalent series resistance and the moisture and heat resistance characteristic of the solid electrolyte capacitor tend to be excellent.

Examples of the cationic moiety of the zwitterionic compound include an imidazolium ion, an ammonium ion, a pyridinium ion, a sulfonium ion, a piperidinium ion and a pyrazolium ion which may each have a substituent. Of these, in view of making the high withstand voltage characteristic, the static capacitance, the tan δ, the leakage current characteristic and the moisture and heat resistance characteristic of the solid electrolyte capacitor excellent, the zwitterionic compound preferably has one or more cationic moieties selected from the group consisting of an imidazolium ion, a pyridinium ion and a pyrazolium ion.

As the zwitterionic compound of the invention, at least any of the compounds represented by the following formulae (2) to (6) is preferably contained. When these zwitterionic compounds are used, the withstand voltage characteristic, the static capacitance, the leakage current characteristic, the tan δ, the equivalent series resistance and the moisture and heat resistance characteristic of the solid electrolyte capacitor improve easily.

[Chem. 2-6]

(2)

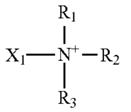

(3)

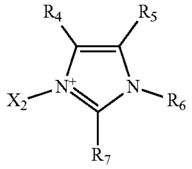

(4)

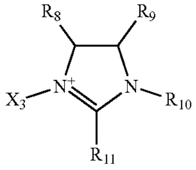

(5)

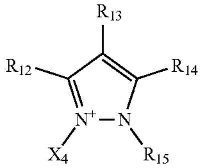

(6)

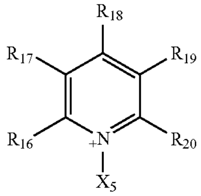

In the formulae (2) to (6), $R_1$ to $R_{20}$ are hydrogen, an alkyl group having 1 to 18 carbon atoms, an alkoxy group having 1 to 1S carbon atoms or a hydroxy group which may be the same or different, and neighboring R's may be linked to form an alkylene group having 2 to 6 carbon atoms. In the formulae (2) to (6), $R_1$ to $R_{20}$ are preferably hydrogen, an alkyl group having 1 to 5 carbon atoms, an alkoxy group having 1 to 5 carbon atoms or a hydroxy group which may be the same or different, and neighboring R's may be linked to form an alkylene group having 2 to 6 carbon atoms. $X_1$ to $X_5$ are preferably a group having 0 to 15 carbon atoms containing any of a sulfonate anion, a carboxylate anion, a phosphate anion and the anion represented by the formula (1). Of these, in the formulae (2) to (6), $X_1$ to $X_5$ are more preferably an organic group having 1 to 10 carbon atoms containing a sulfonate anion, further preferably a sulfonatoalkyl group having 1 to 5 carbon atoms ($—(CH_2)n\text{-}SO_3—$; n is an integer of 1 to 5).

Examples of the zwitterionic compound used in the invention include 1-methyl-3-(3-sulfonatopropyl)-1H-imidazol-3-ium, 1-methyl-3-(4-sulfonatobutyl)-1H-imidazol-3-ium, 1-ethyl-3-(3-sulfonatopropyl)-1H-imidazol-3-ium, 1-ethyl-3-(4-sulfonatobutyl)-1H-imidazol-3-ium, 1-butyl-3-(3-sulfonatopropyl)-1H-imidazol-3-ium, 1-butyl-3-(4-sulfonatobutyl)-1H-imidazol-3-ium, 1-hexyl-3-(3-sulfonatopropyl)-1H-imidazol-3-ium, 1-hexyl-3-(4-sulfonatobutyl)-1H-imidazol-3-ium, trimethylglycine, 2-(methacryloyloxy)ethyl-2-(trimethylammonio)ethyl phosphate, 1-(3-sulfonatopropyl)pyridinium, 1-methyl-2-(3-sulfonatopropyl)-1H-pyrazol-2-ium and 1-methyl-1-(3-sulfonatopropyl)piperidin-1-ium.

Because the dielectric oxide film is repaired and because the withstand voltage characteristic, the tan δ, the static capacitance and the equivalent series resistance of the solid electrolyte capacitor become excellent, a phosphate ester compound or a borate ester compound is preferably contained in the pretreatment agent and the gel layer of the invention.

[Phosphate Ester Compound]

Examples of the phosphate ester compound include polyoxyethylene alkyl (C12, C13) ether phosphate ester, polyoxyethylene alkyl (C8) ether phosphate ester, polyoxyethylene lauryl ether phosphate ester, polyoxyethylene lauryl ether phosphate ester, polyoxyethylene styrenated phenyl ether phosphate ester, polyoxyethylene tridecyl ether phosphate ester, polyoxyethylene tridecyl ether phosphate ester, polyoxyethylene alkyl ether phosphate ester, polyoxyethylene alkyl ether phosphate ester, polyoxyethylene alkyl ether phosphate ester, polyoxyethylene lauryl ether phosphate ester-monoethanolamine salt, polyoxypropylene alkyl ether phosphate ester and polyoxyethylene alkyl ether phosphate ester ·Na salt.

Of the above, the phosphate ester compound used in the invention is preferably a compound represented by the following general formula (7) or (8).

General Formula (7)

[Chem. 7]

(7)

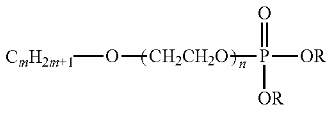

General Formula (8)

[Chem. 8]

(8)

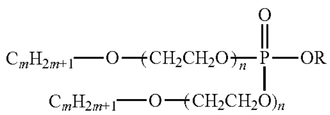

In the formulae (7) and (8), m is an integer of 6 to 25, and n is an integer of 1 to 25. R is at least one kind selected from hydrogen, sodium, potassium and ethanol amine, and the two R's in the formula (7) may be the same or different.

Examples of the commercial compounds represented by the general formula (7) or (8) include PLYSURF A208F (product name, manufactured by DKS Co. Ltd., polyoxyethylene alkyl (C8) ether phosphate ester), PLYSURF A212C (product name, manufactured by DKS Co. Ltd., polyoxyethylene tridecyl ether phosphate ester), PLYSURF A215C (product name, manufactured by DKS Co. Ltd., polyoxyethylene tridecyl ether phosphate ester), PLYSURF A210D (product name, manufactured by DKS Co. Ltd., polyoxyethylene alkyl (C10) ether phosphate ester), PLYSURF DB-01 (product name, manufactured by DKS Co. Ltd., polyoxyethylene lauryl ether phosphate ester monoethanolamine salt), PLYSURF A208B (product name, manufactured by DKS Co. Ltd., polyoxyethylene lauryl ether phosphate ester), and Phosphanol RD-720 (product name, manufactured by TOHO Chemical Industry Co., Ltd., sodium polyoxyethylene oleyl ether phosphate).

[Borate Ester Compound]

Examples of the borate ester compound include methyl borate, dimethyl borate, trimethyl borate, ethyl borate, diethyl borate, triethyl borate, propyl borate, dipropyl borate, tripropyl borate, butyl borate, dibutyl borate, tributyl borate, ethylhexyl borate, diethylhexyl borate, triethylhexyl borate, benzyl borate, dibenzyl borate, tribenzyl borate, phenyl borate, diphenyl borate, triphenyl borate, hexyl borate, dihexyl borate, trihexyl borate, octyl borate, dioctyl borate, trioctyl borate, decyl borate, didecyl borate, tridecyl borate, dodecyl borate, didodecyl borate, tridodecyl borate, acryl borate, diacryl borate, triacryl borate, methacryl borate, dimethacryl borate and trimethacryl borate.

Of the above, the borate ester compound used in the invention is preferably a compound represented by the following general formula (9).

General Formula (9)

[Chem. 9]

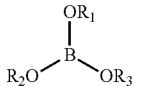

(9)

In the general formula (9), $R_1$ to $R_3$ may be the same or different and are a hydrogen atom or an alkyl group having 1 to 12, preferably 1 to 7, more preferably 1 to 4 carbon atoms.

[Solvent of Pretreatment Agent]

Water or an organic solvent is preferably contained as a solvent in the pretreatment agent and the gel layer of the invention.

As the organic solvent, alcohols, ketones, esters, ethers, cellosolves, aromatic hydrocarbons, aliphatic hydrocarbons, sulfones or the like can be used.

Examples of the alcohols include methanol, ethanol, 1-propanol, isopropyl alcohol, n-butanol, s-butanol, t-butanol, n-amyl alcohol, s-amyl alcohol, t-amyl alcohol, allyl alcohol, isoamyl alcohol, isobutyl alcohol, 2-ethylbutanol, 2-octanol, n-octanol, cyclohexanol, tetrahydrofurfuryl alcohol, furfuryl alcohol, n-hexanol, n-heptanol, 2-heptanol, 3-heptanol, benzylalcohol, methylcyclohexanol, ethylene glycol, ethylene glycol monomethyl ether, glycerin, diethylene glycol, and propylene glycol.

Examples of the ketones include acetone, methyl ethyl ketone, diethyl ketone, cyclohexanone, methyl isobutyl ketone, and methyl-n-propyl ketone.

Examples of the esters include ethyl acetoacetate, ethyl benzoate, methyl benzoate, isobutyl formate, ethyl formate, propyl formate, methyl formate, isobutyl acetate, ethyl acetate, propyl acetate, methyl acetate, methyl salicylate, diethyl oxalate, diethyl tartrate, dibutyl tartrate, ethyl phthalate, methyl phthalate, butyl phthalate, γ-butyrolactone, ethyl malonate, and methyl malonate.

Examples of the ethers include methylglycol, methyldiglycol, methyltriglycol, methylpolyglycol, isopropylglycol, isopropyldiglycol, butylglycol, butyldiglycol, butyltriglycol, isobutylglycol, isobutyldiglycol, butyldiglycol acetate, hexylglycol, hexyldiglycol, 2-ethylhexylglycol, 2-ethylhexyldiglycol, allylglycol, phenylglycol, phenyldiglycol, benzylglycol, benzyldiglycol, methyl propylene glycol, methyl propylene diglycol, methyl propylene triglycol, propyl propylene glycol, propyl propylene diglycol, butyl propylene glycol, butyl propylene diglycol, butyl propylene triglycol, phenyl propylene glycol, methyl propylene glycol acetate, dimethylglycol, dimethyldiglycol, dimethyltriglycol, methylethyldiglycol, diethyldiglycol, dibutyldiglycol, and dimethyl propylene diglycol.

Examples of the cellosolve include methyl cellosolve, and ethyl cellosolve.

Examples of the aromatic hydrocarbons include benzene, toluene, and xylene.

Examples of the aliphatic hydrocarbons include hexane, and cyclohexane.

Examples of the sulfones include sulfolane, dimethylsulfone, ethylmethylsulfone, ethylisopropylsulfone, 3-methylsulfolane, and dimethyl sulfoxide.

One of the solvents can be used, or a mixture thereof can also be used.

Because the withstand voltage characteristic, the tan δ, the leakage current characteristic, the static capacitance and the equivalent series resistance of the solid electrolyte capacitor become excellent, of the solvents, in particular, at least one selected from the group consisting of water, methanol, ethanol, butanol, isopropyl alcohol, ethylene glycol, polyethylene glycol, gamma-butyrolactone and sulfolane is preferable, and water is particularly preferable. That is, because the withstand voltage characteristic, the tan δ, the leakage current characteristic, the static capacitance and the equivalent series resistance of the solid electrolyte capacitor become excellent, the gel layer particularly preferably contains a hydrogel.

[Gel Layer]

By bringing a pretreatment agent obtained by diluting a gelling agent such as fine oxide particles, fine metal particles and a polymer to a predetermined concentration with a solvent into contact with a positive electrode metal having a dielectric oxide film formed thereon and then drying to remove a part of the solvent or the like, a gel layer can be formed on the dielectric oxide film. The method for bringing into contact may be any method but is preferably a method of immersing the positive electrode metal having the dielectric oxide film in the pretreatment agent.

A step of immersing the positive electrode metal having the dielectric oxide film in the pretreatment agent, pulling out and then drying may be repeated multiple times.

The drying may be any from natural drying at room temperature to drying by heating, but drying by heating to 80° C. or higher is preferable.

An example of the more specific step can be a step of immersing the positive electrode metal having the dielectric oxide film in the pretreatment agent for 30 seconds and then drying at 125° C. for 30 minutes.

By forming the gel layer on the positive electrode oxide coating, the withstand voltage characteristic, the tan δ, the leakage current characteristic, the static capacitance and the equivalent series resistance characteristic of the solid electrolyte capacitor improve. Although the mechanism is not known, it is believed that, by forming the gel layer, the dissolution of the compound such as the electrolyte contained in the gel layer in the solid electrolyte layer (electrically conductive polymer layer) can be suppressed.

The gel layer more preferably contains an electrically conductive hydrogel which retains water and an electrolyte because the charge transfer rate is high and because the gel layer can have softness and tackiness.

Because the withstand voltage characteristic, the tan δ, the leakage current characteristic, the static capacitance and the equivalent series resistance characteristic of the solid electrolyte capacitor improve, the water content of the gel layer is preferably 0.01 to 20 mass %, more preferably 0.05 to 15 mass %, more preferably 0.1 to 10 mass %. The water content of the gel layer is measured using a moisture meter using the Karl Fischer method (moisture-measuring device CA-31 manufactured by Nittoseiko Analytech Co., Ltd.).

The gel layer is preferably a physical gel. Although the mechanism is not known, because a physical gel has softness and tackiness, the compound contained in the gel layer can evenly act on the dielectric oxide film, and the withstand voltage characteristic, the tan δ, the leakage current characteristic, the static capacitance and the equivalent series resistance characteristic of the solid electrolyte capacitor improve.

[Gelling Agent]

As the gelling agent contained in the pretreatment agent and the gel layer, fine oxide particles such as fine silica particles and fine alumina particles, fine metal particles such as fine titanium particles, a hydrophilic polymer such as agar, gelatin, carrageenan, gum karaya, alginic acid, sodium alginate, cellulose, polyvinyl alcohol, polystyrene sulfonic acid or a salt thereof, polyethylene glycol, polyacrylic acid or a salt thereof, polyacrylamide, starch, polyvinylpyrrolidone, carboxymethyl cellulose or a salt thereof and hydrophilic polyurethane or the like can be used. These gelling agents form a physical gel and are thus preferably used. Of the gelling agents, considering the stability of the quality, the tackiness, the conductivity, the shape-retaining property and the like, fine silica particles and polystyrene sulfonic acid are preferably used.

A kind of hydrophilic polymer may be used, or two or more kinds may be mixed and used according to the need.

As the fine silica particles as the gelling agent, colloidal silica is preferably used.

<Colloidal Silica>

Colloidal silica is a colloid of $SiO_2$ or a hydrate thereof, has a particle size of 1 to 300 nm and does not have any fixed structure. Colloidal silica can be obtained by causing dilute hydrochloric acid to act on a silicate and then conducting dialysis. Gelation advances more easily as the particle size becomes smaller while gelation becomes difficult as the particle size becomes larger. The particle size of the colloidal silica used in the invention is preferably 10 to 50 nm, more preferably 10 to 30 nm. When colloidal silica having the particle size is used, the colloidal silica does not easily become a gel in the pretreatment agent, and a stably dispersed state can be maintained also during the use of the pretreatment agent.

The colloidal silica hardly dissolves in water or an organic solvent and can be generally used in the state of being added to the pretreatment agent as a colloidal solution dispersed in a suitable dispersion solvent.

The colloidal silica used in the invention may be sodium-stabilized colloidal silica, acidic colloidal silica or ammonia-stabilized colloidal silica. In the sodium-stabilized colloidal silica, the surface of the colloidal silica is ONa group. The acidic colloidal silica is colloidal silica in which the surface of the colloidal silica is OH group without Na, and the ammonia-stabilized colloidal silica is colloidal silica stabilized by removing Na to convert to OH group and then adding ammonia. Of these, acidic colloidal silica or ammonia-stabilized colloidal silica, which has a low sodium ion content, is preferable.

The colloidal silica content of the pretreatment agent is 0.01 to 20 mass %, more preferably 0.03 to 15 mass %, particularly preferably 0.05 to 10 mass %. In the range, the withstand voltage characteristic of the electrolyte capacitor improves through the pretreatment of the positive electrode metal using the pretreatment agent.

The average particle size of the colloidal silica may be any size and is preferably 1 to 100 nm, more preferably 10 to 50 nm, particularly preferably 10 to 30 nm. With the average particle size, a pretreatment agent with excellent dispersibility in the solvent can be obtained.

The form of the colloidal silica may be any of a spherical type, a chain type and a cyclic type in which the colloidal silica coheres into a ring and is dispersed in a solvent.

Examples of commercial products of the colloidal silica include series SNOWTEX manufactured by Nissan Chemical Corporation, acidic sols "ST-OXS", "ST-OS", "ST-O", "ST-040", "ST-OL", "ST-OYL", "ST-OUP", "ST-PS-MO" and "ST-N40", $NH_4^+$-stabilized alkaline sols "ST-NXS", "ST-NS", "ST-N" and "ST-N-40", $Na^+$-stabilized alkaline sols "ST-XS", "ST-S", "ST-30", "ST-50-T", "ST-30L", "ST-YL", "ST-ZL", "MP-1040", "MP-2040", "MP-4540M", "ST-UP", "ST-PS-S" and "ST-PS-M", sols with improved stability in neutral range "ST-CXS", "ST-C" and "ST-CM", cationic surface acidic sols "ST-AK", "ST-AK-L" and "ST-AK-YL", and special aqueous silicate solutions "ST-K2", "LSS-35", "LSS-45" and "LSS-75". A kind thereof may be used, or two or more kinds thereof may be used in combination.

[Pretreatment Agent Obtained by Diluting Electrolyte and Gelling Agent to Predetermined Concentration with Solvent]

When the pretreatment agent contains an electrolyte, the pretreatment agent diluted to a predetermined concentration with a solvent is obtained by diluting preferably with 0.1 to 10000 parts by weight of the solvent based on one part by weight of the electrolyte, more preferably with 0.5 to 5000 parts by weight of the solvent based on one part by weight of the electrolyte, particularly preferably with 1.0 to 1000 parts by weight of the solvent based on one part by weight of the electrolyte. In the range, the electrolyte can be retained efficiently in the positive electrode metal, and a solid electrolyte capacitor having particularly excellent withstand voltage characteristic, tan δ, leakage current characteristic, static capacitance and equivalent series resistance characteristic can be produced.

The pretreatment agent diluted to a predetermined concentration with a solvent is obtained by diluting preferably with 0.1 to 10000 parts by weight of the solvent based on one part by weight of the gelling agent, more preferably with 0.5 to 5000 parts by weight of the solvent based on one part by weight of the gelling agent, particularly preferably with 1.0 to 1000 parts by weight of the solvent based on one part by weight of the gelling agent. In the range, the gel layer can be retained efficiently on the dielectric oxide coating on the positive electrode metal, and a solid electrolyte capacitor having particularly excellent withstand voltage characteristic, tan δ, leakage current characteristic, static capacitance and equivalent series resistance characteristic can be produced.

[Solid Electrolyte]

The electrically conductive polymer used in the step of forming the solid electrolyte layer is preferably a polymer doped with a dopant. The monomer compound used for producing the polymer is not particularly restricted, and for example, pyrroles, thiophenes, anilines or the like can be used. However, a thiophene compound represented by the following general formula (10) is more preferable because of the excellent conductivity.

General Formula (10)

[Chem. 10]

(10)

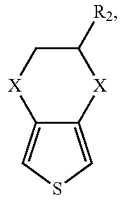

In the general formula (10), $R_{21}$ represents a hydrogen atom or a linear or branched alkyl group having 1 to 6 carbon atoms, and X's represent an oxygen atom or a sulfur atom which may be the same or different.

Specific examples of the thiophene compound represented by the general formula (10) include 3,4-ethylenedioxythiophene, methyl-3,4-ethylenedioxythiophene, ethyl-3,4-ethylenedioxythiophene, propyl-3,4-ethylenedioxythiophene, 3,4-propylenedioxythiophene, methyl-3,4-propylenedioxythiophene, ethyl-3,4-propylenedioxythiophene, propyl-3,4-propylenedioxythiophene, 3,4-ethylenedithiathiophene, methyl-3,4-ethylenedithiathiophene, ethyl-3,4-ethylenedithiathiophene, propyl-3,4-ethylenedithiathiophene, 3,4-propylenedithiathiophene, methyl-3,4-propylenedithiathiophene, ethyl-3,4-propylenedithiathiophene, and propyl-3,4-propylenedithiathiophene.

Of these, in particular, 3,4-ethylenedioxythiophene, methyl-3,4-ethylenedioxythiophene and ethyl-3,4-ethylenedioxythiophene are particularly preferable in view of the excellent electrical characteristic in the solid electrolyte capacitor.

The electrically conductive polymer which can be used in the invention can be obtained through chemical oxidative polymerization of the monomer compound, such as the thiophene compound represented by the general formula (10), in the presence of a dopant. As the oxidizer for the chemical oxidative polymerization, for example, the known oxidizers described in JP2010-31160A can be used.

The dopant has a functional group which can cause chemical oxidative doping to a polymer and is preferably a sulfate ester group, a phosphate ester group, a phosphoric acid group, a carboxyl group, a sulfo group or the like. Of these, in view of the doping effect, a sulfate ester group, a carboxyl group and a sulfo group are more preferable, and a sulfo group is particularly preferable.

Examples of the dopant include halogen ions such as iodine, bromine and chlorine, halide ions such as hexafluorophosphorus, hexafluoroarsenic, hexafluoroantimony, tetrafluoroboron and perchloric acid, alkyl-substituted organic sulfonic acid ions such as methanesulfonic acid and dodecylsulfonic acid, cyclic sulfonic acid ions such as camphor sulfonic acid ion, alkyl-substituted or unsubstituted benzene mono- or disulfonic acid ions such as benzenesulfonic acid, paratoluenesulfonic acid, dodecylbenzenesulfonic acid and benzenedisulfonic acid, alkyl-substituted or unsubstituted ions of naphthalenesulfonic acid in which one to four sulfonic acid groups are substituted such as 2-naphthalenesulfonic acid and 1,7-naphthalenedisulfonic acid, alkyl-substituted or unsubstituted biphenylsulfonic acid ions such as anthracenesulfonic acid ion, anthraquinonesulfonic acid ion, alkylbiphenylsulfonic acid and biphenyldisulfonic acid, polymeric sulfonic acid ions and the like such as polystyrenesulfonic acid and naphthalenesulfonic acid formalin condensate, heteropoly acid ions such as molybdophosphoric acid, tungstophosphoric acid and tungstomolybdophosphoric acid, methoxybenzenesulfonic acid, ethoxybenzenesulfonic acid and xylenesulfonic acid. Of these, at least one kind selected from polystyrenesulfonic acid, benzenesulfonic acid, paratoluenesulfonic acid, methoxybenzenesulfonic acid, ethoxybenzenesulfonic acid and xylenesulfonic acid is more preferable, and paratoluenesulfonic acid is particularly preferable.

[Step of Forming Solid Electrolyte Layer]

Next, the step of forming the solid electrolyte layer is described. A mixture solution containing the monomer compound, the dopant and the oxidizer described above is brought into contact with the positive electrode metal retaining the gel layer and then polymerized, and thus, a capacitor element in which an electrically conductive polymer is formed on the positive electrode metal retaining the electrolyte is produced. The method for bringing into contact may be any method but is preferably a method of immersing in the mixture solution containing the monomer compound, the dopant and the oxidizer described above.

That is, a step of immersing the positive electrode metal retaining the gel layer in a solution containing the monomer compound and the dopant described above, pulling out, then heating to form an electrically conductive polymer through chemical oxidative polymerization on the positive electrode metal having a dielectric oxide film is preferably included.

The step of immersing the positive electrode metal having the dielectric oxide film in a mixture solution containing the monomer compound, the dopant and the oxidizer described above, pulling out and then drying may be repeated multiple times.

The step of forming the solid electrolyte may also be a chemical polymerization method in which the monomer compound and an oxidizer solution containing the dopant are brought into contact alternately, an electrolytic polymerization method or a method of bringing an electrically conductive polymer dispersion into contact with the positive electrode metal.

The drying may be any from natural drying at room temperature to drying by heating, but when a high-boiling organic solvent is contained in the electrically conductive polymer dispersion, drying by heating to 150° C. or higher is preferable.

[Solid Electrolyte Capacitor]

Depending on the kind and the form of the positive electrode metal used, the solid electrolyte capacitor can be a chip type or a wound type.

EXAMPLES

Example 1

An aluminum positive electrode foil having a size of 7×100 mm was prepared as the positive electrode metal and wound with a negative electrode foil facing through a separator paper, and a capacitor element was prepared by attaching leads to the positive electrode foil and the negative electrode foil. Here, the aluminum positive electrode foil was subjected to chemical conversion treatment in advance to form a dielectric oxide film.

(Production of Pretreatment Agent)

Five parts by weight of 1-methyl-3-(3-sulfonatopropyl)-1H-imidazol-3-ium as an electrolyte and 2 parts by weight of colloidal silica (manufactured by Nissan Chemical Corporation, SNOWTEX 0-40, an aqueous dispersion, a solid content of 40%, an average particle size of 20 to 30 nm, pH 2.0 to 4.0) were diluted with 93 parts by weight of water, and thus a pretreatment agent was obtained.

(Production of Mixture Solution Containing Electrically Conductive Polymer Monomer, Dopant and Oxidizer)

Four parts of 2-ethyl-2,3-dihydrothieno[3,4-b]-1,4-dioxine (2-ethyl-EDOT) and 10 parts of 50% ferric paratoluenesulfonate/ethanol solution were mixed, and thus a mixture solution containing an electrically conductive polymer monomer, a dopant and an oxidizer was obtained.

(Step of Forming Gel Layer)

Next, the capacitor element was immersed in the pretreatment agent for 30 seconds, and the element was slowly pulled out and then air-dried at 125° C. for 30 minutes. The water content of the gel layer which was measured using a moisture meter using the Karl Fischer method (moisture-measuring device CA-31 manufactured by Nittoseiko Analytech Co., Ltd.) was 3%.

(Step of Forming Solid Electrolyte Layer)

Next, by conducting a step of immersing the capacitor element in the mixture solution containing the electrically conductive polymer monomer, the dopant and the oxidizer obtained above for 30 seconds and drying at 85° C. for 30 minutes and then by further conducting thermal treatment at 230° C. for 3 minutes, a solid electrolyte layer was formed, and a capacitor element was thus produced and subjected to assessment.

Example 2

A solid electrolyte capacitor was produced in the same manner as in Example 1 except that 1-methyl-3-(4-sulfonatobutyl)-1H-imidazol-3-ium was used as the electrolyte.

Example 3

A solid electrolyte capacitor was produced in the same manner as in Example 1 except that 1-butyl-3-(4-sulfonatobutyl)-1H-imidazol-3-ium was used as the electrolyte.

Example 4

A solid electrolyte capacitor was produced in the same manner as in Example 1 except that 1-methyl-2-(3-sulfonatopropyl)-1H-pyrazol-2-ium was used as the electrolyte.

Example 5

A solid electrolyte capacitor was produced in the same manner as in Example 1 except that 1-(3-sulfonatopropyl) pyridin-1-ium was used as the electrolyte.

Example 6

A solid electrolyte capacitor was produced in the same manner as in Example 1 except that 1-methyl-1-(3-sulfonatopropyl)piperidin-1-ium was used as the electrolyte.

Example 7

A solid electrolyte capacitor was produced in the same manner as in Example 1 except that ammonium phosphate was used as the electrolyte.

Example 8

A solid electrolyte capacitor was produced in the same manner as in Example 1 except for using a pretreatment agent obtained by diluting 5 parts by weight of PLYSURF A208F (manufactured by DKS Co. Ltd.) as a phosphate ester compound and 2 parts by weight of colloidal silica (manufactured by Nissan Chemical Corporation, SNOWTEX 0-40, an aqueous dispersion, a solid content of 40%, an average particle size of 20 to 30 nm, pH 2.0 to 4.0) with 93 parts by weight of water.

Example 9

A solid electrolyte capacitor was produced in the same manner as in Example 1 except for using a pretreatment agent obtained by diluting 5 parts by weight of tributyl borate (manufactured by Tokyo Chemical Industry Co., Ltd.) as a borate ester compound and 2 parts by weight of colloidal silica (manufactured by Nissan Chemical Corporation, SNOWTEX 0-40, an aqueous dispersion, a solid content of 40%, an average particle size of 20 to 30 nm, pH 2.0 to 4.0) with 93 parts by weight of water.

Example 10

A solid electrolyte capacitor was produced in the same manner as in Example 1 except for using a pretreatment agent obtained by diluting 5 parts by weight of 1-methyl-3-(3-sulfonatopropyl)-1H-imidazol-3-ium as an electrolyte, 5 parts by weight of ammonium phosphate and 2 parts by weight of colloidal silica (manufactured by Nissan Chemical Corporation, SNOWTEX 0-40, an aqueous dispersion, a solid content of 40%, an average particle size of 20 to 30 nm, pH 2.0 to 4.0) with 88 parts by weight of water.

Example 11

A solid electrolyte capacitor was produced in the same manner as in Example 1 except for using a pretreatment agent obtained by diluting 5 parts by weight of 1-methyl-3-(3-sulfonatopropyl)-1H-imidazol-3-ium as an electrolyte, 5 parts by weight of PLYSURF A208F (manufactured by DKS Co. Ltd.) as a phosphate ester compound and 2 parts by weight of colloidal silica (manufactured by Nissan Chemical Corporation, SNOWTEX 0-40, an aqueous dispersion, a solid content of 40%, an average particle size of 20 to 30 nm, pH 2.0 to 4.0) with 88 parts by weight of water.

Example 12

A solid electrolyte capacitor was produced in the same manner as in Example 1 except for using a pretreatment agent obtained by diluting 5 parts by weight of 1-methyl-3-(3-sulfonatopropyl)-1H-imidazol-3-ium as an electrolyte, 5 parts by weight of tributyl borate (manufactured by Tokyo Chemical Industry Co., Ltd.) as a borate ester compound and 2 parts by weight of colloidal silica (manufactured by Nissan Chemical Corporation, SNOWTEX 0-40, an aqueous dispersion, a solid content of 40%, an average particle size of 20 to 30 nm, pH 2.0 to 4.0) with 88 parts by weight of water.

Examples 13 to 24

Solid electrolyte capacitors were produced in the same manners as in Examples 1 to 12 except that sodium polystyrene sulfonate was added instead of the colloidal silica in the production of the pretreatment agent.

Comparative Example 1

A solid electrolyte capacitor was produced in the same manner as in Example 1 except that the step of forming the gel layer described in Example 1 was not conducted.

Comparative Example 2

A solid electrolyte capacitor was produced using a polymerization solution obtained by adding a borate ester compound to a mixture solution containing an electrically conductive polymer monomer, a dopant and an oxidizer. That is, 4 parts of 2-ethyl-2,3-dihydrothieno[3,4-b]-1,4-dioxine (2-ethyl-EDOT), 10 parts of 50% ferric paratoluenesulfonate/ethanol solution and 1.4 parts of tributyl borate (manufactured by Tokyo Chemical Industry Co., Ltd.) were mixed, and thus a mixture solution containing an electrically conductive polymer monomer, a dopant, an oxidizer and a borate ester compound was obtained. The solid electrolyte capacitor was produced in the same manner as in Example 1 except that the step of forming the gel layer described in Example 1 was not conducted and that the mixture solution was used.

<Assessment of Solid Electrolyte Capacitors>

Regarding the solid electrolyte capacitors obtained in Examples 1 to 24 and Comparative Examples 1 and 2, using a precision LCR meter E4980A manufactured by Agilent Technologies, Inc., the static capacitances (μF) and the tan δ at 120 Hz were measured, and the equivalent series resistances (ESR) at 100 kHz were measured. Moreover, using a DC voltage current source/monitor R6243 manufactured by Advantest, a DC voltage was applied to the electrodes of each solid electrolyte capacitor and increased at a rate of 0.2 V/second, and the current value was measured after 60 seconds had passed. The current was regarded as the leakage current value, and the voltage at the current of 0.5 A was measured and regarded as the withstand voltage. The measurement results are shown in Table 1.

TABLE 1

| | Static Capacitance (μF) | Equivalent Series Resistance ESR (mΩ) | Withstand Voltage (V) | tan δ | Leakage Current (mA) |
|---|---|---|---|---|---|
| Example 1 | 625 | 4.3 | 70 | 0.03 | 0.03 |
| Example 2 | 625 | 4.3 | 70 | 0.03 | 0.03 |
| Example 3 | 630 | 4.2 | 72 | 0.02 | 0.02 |
| Example 4 | 625 | 4.3 | 70 | 0.03 | 0.03 |
| Example 5 | 625 | 4.3 | 70 | 0.03 | 0.03 |
| Example 6 | 625 | 4.3 | 70 | 0.03 | 0.03 |
| Example 7 | 610 | 4.5 | 65 | 0.04 | 0.04 |
| Example 8 | 610 | 4.5 | 65 | 0.04 | 0.04 |
| Example 9 | 610 | 4.5 | 65 | 0.04 | 0.04 |
| Example 10 | 650 | 4.0 | 80 | 0.01 | 0.01 |
| Example 11 | 640 | 4.0 | 75 | 0.02 | 0.02 |
| Example 12 | 640 | 4.0 | 75 | 0.02 | 0.02 |
| Example 13 | 615 | 4.5 | 65 | 0.04 | 0.04 |
| Example 14 | 615 | 4.5 | 65 | 0.04 | 0.04 |
| Example 15 | 620 | 4.4 | 67 | 0.03 | 0.03 |
| Example 16 | 615 | 4.5 | 65 | 0.04 | 0.04 |
| Example 17 | 615 | 4.5 | 65 | 0.04 | 0.04 |
| Example 18 | 615 | 4.5 | 65 | 0.04 | 0.04 |
| Example 19 | 600 | 4.7 | 60 | 0.05 | 0.05 |
| Example 20 | 600 | 4.7 | 60 | 0.05 | 0.05 |
| Example 21 | 600 | 4.7 | 60 | 0.05 | 0.05 |
| Example 22 | 640 | 4.2 | 75 | 0.02 | 0.02 |
| Example 23 | 630 | 4.2 | 70 | 0.03 | 0.03 |
| Example 24 | 630 | 4.2 | 70 | 0.03 | 0.03 |
| Comparative Example 1 | 430 | 7.5 | 35 | 0.15 | 0.25 |
| Comparative Example 2 | 490 | 6.0 | 38 | 0.10 | 0.15 |

TABLE 1-continued

As shown above, in the Examples, solid electrolyte capacitors having excellent withstand voltage characteristic, leakage current characteristic, static capacitance and equivalent series resistance characteristic could be obtained.

INDUSTRIAL APPLICABILITY

The solid electrolyte capacitor of the invention has excellent withstand voltage characteristic, leakage current characteristic, static capacitance and equivalent series resistance characteristic and thus can be applied to a high-frequency digital device and the like.

The invention claimed is:

1. A solid electrolyte capacitor, comprising:

a positive electrode metal comprising a dielectric oxide film formed thereon;

a gel layer on the positive electrode metal; and a solid electrolyte layer on the gel layer, wherein the gel layer comprises a zwitterionic compound of any of formulas (2) to (6):

(2)

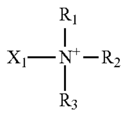

(3)

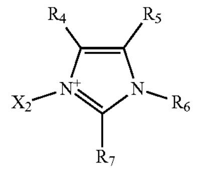

(4)

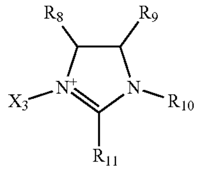

(5)

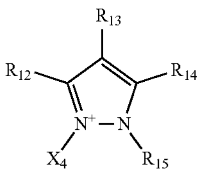

(6)

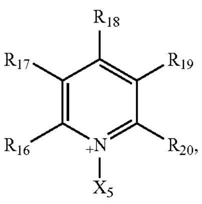

, wherein $R_1$ to $R_{20}$ are each independently a hydrogen atom or an organic group comprising a primary amino group and/or a secondary amino group, neighboring Rs optionally being linked to form an alkylene group having 2 to 6 carbon atoms, and $X_1$ to $X_5$ are a group comprising (i) 0 to 15 carbon atoms and (ii) a sulfonate anion, a carboxylate anion, a phosphate anion, a borate anion, and/or an anion of formula (1);

(1)

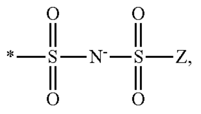

wherein

Z is an alkyl group having 1 to 15 carbon atoms, an alkyl halide group having 1 to 15 carbon atoms, an aryl group having 6 to 15 carbon atoms, an aryl halide group having 6 to 15 carbon atoms, or a halogen, and

* is a bond.

2. The solid electrolyte capacitor of claim 1, wherein the gel layer comprises a hydrogel.

3. The solid electrolyte capacitor of claim 1, wherein the gel layer comprises a physical gel.

4. The solid electrolyte capacitor of claim 3, wherein the gel layer further comprises agar, gelatin, carrageenan, alginic acid, cellulose, polyvinyl alcohol, fine silica particles, fine alumina particles, fine titanium particles, and/or polystyrene sulfonic acid.

5. The solid electrolyte capacitor of claim 1, wherein the gel layer further comprises an electrolyte.

6. The solid electrolyte capacitor of claim 1, wherein the gel layer further comprises an electrolytes of any of formulas (11) to (15):

(11)

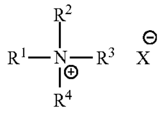

(12)

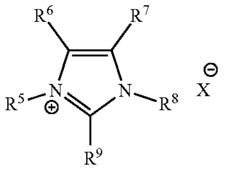

(13)

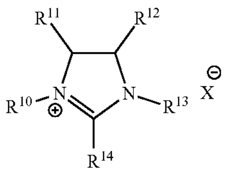

(14)

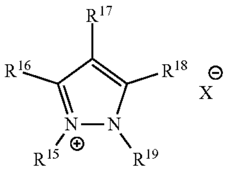

-continued (15)

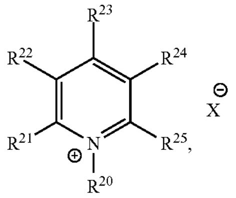

wherein $R^1$ to $R^{25}$ are each independently hydrogen, an alkyl group having 1 to 18 carbon atoms, an alkoxy group having 1 to 18 carbon atoms, or a hydroxy group, neighboring groups of $R^1$ to $R^{25}$ optionally being linked to form an alkylene group having 2 to 6 carbon atoms, and $X^-$ is a carboxylate anion, a boron compound anion, or a phosphoric acid compound anion.

7. The solid electrolyte capacitor of claim 1, wherein a water content of the gel layer is in a range of from 0.01% to 20%.

8. A method for producing the solid electrolyte capacitor of claim 1, the method comprising:

forming the gel layer on a positive electrode metal having a dielectric oxide film formed thereon; and subsequently forming the solid electrolyte layer.

9. The method of claim 8, wherein the forming of the gel layer comprises forming the gel layer on the positive electrode metal comprising the dielectric oxide film formed thereon with a pretreatment agent.

10. The solid electrolyte capacitor of claim 1, wherein the gel layer comprises the zwitterionic compound of formula (2).

11. The solid electrolyte capacitor of claim 1, wherein the gel layer comprises the zwitterionic compound of formula (3).

12. The solid electrolyte capacitor of claim 1, wherein the gel layer comprises the zwitterionic compound of formula (4).

13. The solid electrolyte capacitor of claim 1, wherein the gel layer comprises the zwitterionic compound of formula (5).

14. The solid electrolyte capacitor of claim 1, wherein the gel layer comprises the zwitterionic compound of formula (6).

15. A solid electrolyte capacitor, comprising:

a positive electrode metal comprising a dielectric oxide film formed thereon;

a gel layer on the positive electrode metal; and a solid electrolyte layer on the gel layer, wherein the gel layer comprises a phosphate ester compound of formula (7) or (8)

(7)

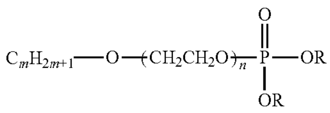

(8)

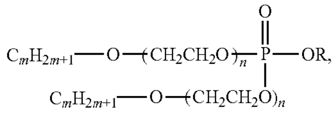

wherein m is an integer in a range of from 6 to 25, n is an integer in a range of from 1 to 25, R is hydrogen, sodium, potassium, and/or monoethanolamine, two R's in the formula (7) optionally being identical.

16. The solid electrolyte capacitor of claim 15, wherein the gel layer comprises the zwitterionic compound of formula (7).

17. The solid electrolyte capacitor of claim 15, wherein the gel layer comprises the zwitterionic compound of formula (8).

18. A solid electrolyte capacitor, comprising:

a positive electrode metal comprising a dielectric oxide film formed thereon;

a gel layer on the positive electrode metal; and a solid electrolyte layer on the gel layer, wherein the gel layer comprises a borate ester of formula (9)

(9)

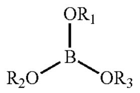

wherein $R_1$ to $R_3$ are each independently a hydrogen atom or an alkyl group having 1 to 12 carbon atoms.

19. A pretreatment agent, comprising:

water;

a gelling agent; and a zwitterionic compounds of any of formulas (2) to (6):

(2)

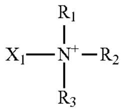

(3)

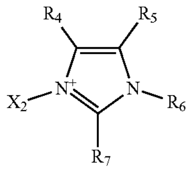

-continued (4)

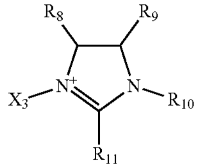

(5)

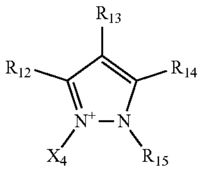

(6)

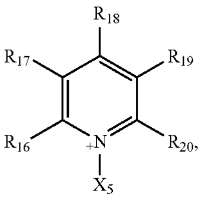

wherein $R_1$ to $R_{20}$ are each independently a hydrogen atom, or an organic group comprising a primary amino group and/or a secondary amino group, neighboring Rs optionally being linked to form an alkylene group having 2 to 6 carbon atoms, and $X_1$ to $X_5$ are a group of formula (1), comprising (i) 0 to 15 carbon atoms and (ii) a sulfonate anion, a carboxylate anion, a phosphate anion, a borate anion, and/or an anion:

(1)

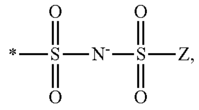

wherein

Z is an alkyl group having 1 to 15 carbon atoms, an alkyl halide group having 1 to 15 carbon atoms, an aryl group having 6 to 15 carbon atoms, an aryl halide group having 6 to 15 carbon atoms, or a halogen, and

* is a bond.

20. The agent of claim 19, wherein the gel layer comprises the zwitterionic compound of formula (2).

* * * * *